(12) United States Patent
Amimoto et al.

(10) Patent No.: US 6,319,986 B1
(45) Date of Patent: *Nov. 20, 2001

(54) SEMIAROMATIC POLYAMIDE RESIN COMPOSITION

(75) Inventors: Yoshikatsu Amimoto; Yoshimasa Ogo; Masayuki Sakka, all of Waki-cho (JP)

(73) Assignee: Mitsui Chemicals, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/345,408

(22) Filed: Jul. 1, 1999

(30) Foreign Application Priority Data

Jul. 2, 1998 (JP) .................................................. 10-187217

(51) Int. Cl.⁷ ...................................................... C08L 77/00
(52) U.S. Cl. ............................................. 525/66; 428/35.7
(58) Field of Search ................................ 525/66; 428/357

(56) References Cited

U.S. PATENT DOCUMENTS

| | | | |
|---|---|---|---|
| 5,071,924 | * 12/1991 | Koch et al. | 525/432 |
| 5,424,104 | * 6/1995 | Amimoto et al. | 428/36.8 |
| 5,786,423 | * 7/1998 | Tsumiyama et al. | 525/66 |
| 6,117,942 | 9/2000 | Ogo et al. | 525/66 |

FOREIGN PATENT DOCUMENTS

| | | |
|---|---|---|
| 543768 | 2/1993 | (JP) . |
| 59381 | 11/1993 | (JP) . |
| 753715 | 2/1995 | (JP) . |

\* cited by examiner

Primary Examiner—Ana Woodward

(57) ABSTRACT

A semiaromatic polyamide resin composition comprising:
- (A) a polyamide copolymer in which a main constituent component unit is a polyamide formed of a recurring unit of a dicarboxylic acid component unit and a diamine component unit, at least not less than 45 mol % of said dicarboxylic acid component unit being a terephthalic acid component unit, and said diamine component unit comprising a straight-chain alkylenediamine component unit and/or an alkylenediamine component unit having a side-chain alkyl group;
- (B) an aliphatic polyamide containing, a unit derived from a lactam having 12 carbon atoms, a unit derived from an aminocarboxylic acid having 12 carbon atoms or a unit derived from a dodecanoic diacid and a diamine; and
- (C) a graft-modified product of a graft-modified ethylene/α-olefin copolymer, a graft-modified product of an aromatic vinyl compound/conjugated diene copolymer, or a graft-modified product of a hydrogenated product of the aromatic vinyl compound/conjugated diene copolymer. The resin composition little precipitates the oligomer during the molding, little causes the vent of the metal mold to be clogged, is suited for conducting the molding operation for extended periods of time, and further exhibits excellent resistance against aging by heat, anti-creeping property, shock resistance and ejectability.

10 Claims, 3 Drawing Sheets

FRONT VIEW — METAL MOLD

SIDE VIEW — VENT PORTION — RUNNER
VACUUM SYSTEM — $l = 3mm$ — METAL MOLD — $h = 10/1000 mm$ — SPACE FOR TEST PIECE — $T = 1/16"$ (3.2mm)

BURNED — TEST PIECE

SEMIAROMATIC POLYAMIDE RESIN COMPOSITION

BACKGROUND OF THE INVENTION

1. Field of the Invention

The present invention relates to a semiaromatic polyamide resin composition which exhibits excellent anti-creeping property under high temperature and high humidity conditions, causes less contamination to the metal mold (mold deposit) during the molding operation, and can make a molded parts easy to be ejected from the mold.

2. Description of the Prior Art

There have heretofore been proposed a variety of semi-aromatic polyamides having shock resistance. For example, Japanese Unexamined Patent Publication (Kokai) No. 108855/1992 discloses a method of producing a polyamide composition comprising:

a semiaromatic polyamide having;
- (a) a dicarboxylic acid unit comprising 50 to 100 mol % of a terephthalic acid unit and 0 to 40 mol % of aromatic dicarboxylic acid other than terephthalic acid or a straight-chain aliphatic dicarboxylic acid unit having 6 to 18 carbon atoms; and
- (b) an alkylenediamine unit; and a modified elastic copolymer.

It has also been known that the composition comprising such a semiaromatic polyamide and a modified elastic polymer, features excellent heat resistance and shock resistance (Japanese Unexamined Patent Publications (Kokai) Nos. 41318/1990 and 98152/1993).

Such polyamides are very excellent with respect to shock resistance, heat resistance, mechanical properties, and chemical and physical properties, but often precipitate a white powder in the metal mold when they are injection-molded repetitively by using a metal mold. When used for electronic equipment, furthermore, these polyamides fail to exhibit satisfactory anti-creeping property under high temperature and high humidity conditions, leaving room for improvement.

The present inventors have analyzed the powder and have discovered that the powder comprises unreacted monomer, low grade oligomer component and decomposed product of polymer. The unreacted monomer, low grade oligomer and decomposed product of polymer become a cause of problem, impairing the appearance and dimensional precision when the electronic parts are to be molded and, particularly, when fine parts are to be molded such as connectors. Besides, the white powder formed in the metal mold clogs the vent holes of the metal mold. Therefore, the molding operation must be interrupted to clean the metal mold.

The present inventors have previously proposed a semi-aromatic polyamide resin composition comprising a particular polyamide copolymer and a modified ethylene/α-olefin copolymer (Japanese Patent Application No. 52273/1998). This resin composition effectively improves the above-mentioned problem, exhibits excellent mechanical strength such as rigidity, shock resistance and bending strength, exhibits excellent anti-creeping property, exhibits excellent chemical and physical properties such as shock resistance and heat resistance, causes little contamination to the metal mold (mold deposit) during the molding operation for a long time, little cause the vent in the metal mold to be clogged, and makes it possible to obtain precisely molded articles having excellent appearance, which are excellent advantages.

However, the previously proposed resin composition has a problem in that it requires a large force for being ejected from the metal mold after molded. When articles such as connectors are to be molded, for example, metal molds having complex structures are used, and the molded articles are poorly parted, still leaving much room for improvement.

SUMMARY OF THE INVENTION

The object of the present invention, therefore, is to provide a semiaromatic polyamide resin composition having excellent properties such as anti-creeping property under high temperature and high humidity conditions, causing little contamination to the metal mold during the molding operation, and featuring improved property for being ejected from the metal mold.

According to the present invention, there is provided a semiaromatic polyamide resin composition comprising:

- (A) a polyamide copolymer in which a main constituent component unit is a polyamide formed of a recurring unit of a dicarboxylic acid component unit and a diamine component unit, at least not less than 45 mol % of said dicarboxylic acid component unit being a terephthalic acid component unit, and said diamine component unit comprising a straight-chain alkylene-diamine component unit having 4 to 18 carbon atoms and/or an alkylenediamine component unit having a side-chain alkyl group and 4 to 18 carbon atoms;
- (B) an aliphatic polyamide containing, as a constituent unit, at least the one selected from the group consisting of (i) a unit derived from a lactam having 12 carbon atoms, (ii) a unit derived from an aminocarboxylic acid having 12 carbon atoms and (iii) a unit derived from a dodecanoic diacid and a diamine; and
- (C) at least one kind of graft-modified product selected from the group consisting of a graft-modified ethylene/α-olefin copolymer, a graft-modified product of an aromatic vinyl compound/conjugated diene copolymer, and a graft-modified product of a hydrogenated product of the graft-modified aromatic vinyl compound/conjugated diene copolymer;

said component (A) being contained in an amount of from 98 to 65% by weight and, preferably, from 88.5 to 76% by weight, said component (B) being contained in an amount of from 1 to 10% by weight and, preferably, from 1.5 to 4% by weight, and said component (C) being contained in an amount of from 1 to 25% by weight and, preferably, from 10 to 20% by weight per the sum of the components (A), (B) and (C).

In the semiaromatic polyamide resin composition of the present invention, it is desired that:

1. the polyamide copolymer (A) has a melting point over a range of from 280 to 330° C. as measured by DSC;
2. the polyamide copolymer (A) contains an aromatic carboxylic acid unit other than the terephthalic acid and/or an aliphatic dicarboxylic acid unit having 4 to 20 carbon atoms in an amount of not larger than 55 mol % per the whole dicarboxylic acid units;
3. the polyamide (B) has a flexural modulus of elasticity of not smaller than 1300 MPa as measured in the form of a test piece obtained by the injection molding in compliance with ASTM D 790; and
4. the graft-modified product (C) has a density over a range of from 0.85 to 0.95 g/cm$^3$.

DESCRIPTION OF THE PREFERRED EMBODIMENT

Figure 1A:
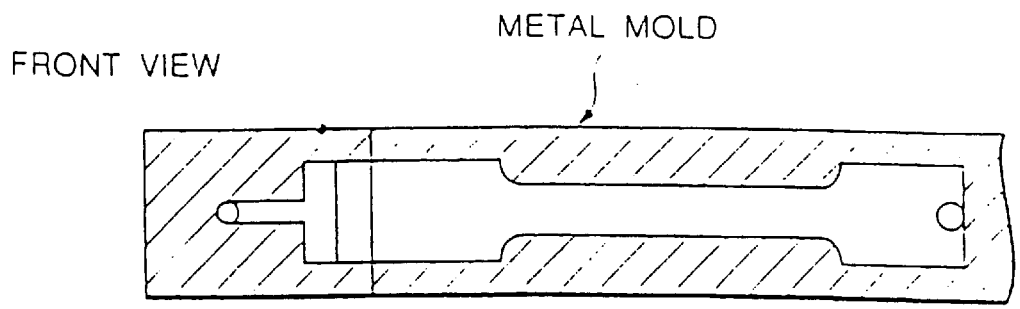
FIG. 1(A) is a sectional view of a metal mold used for evaluating the clogging of the metal mold in Examples.
Figure 1A:
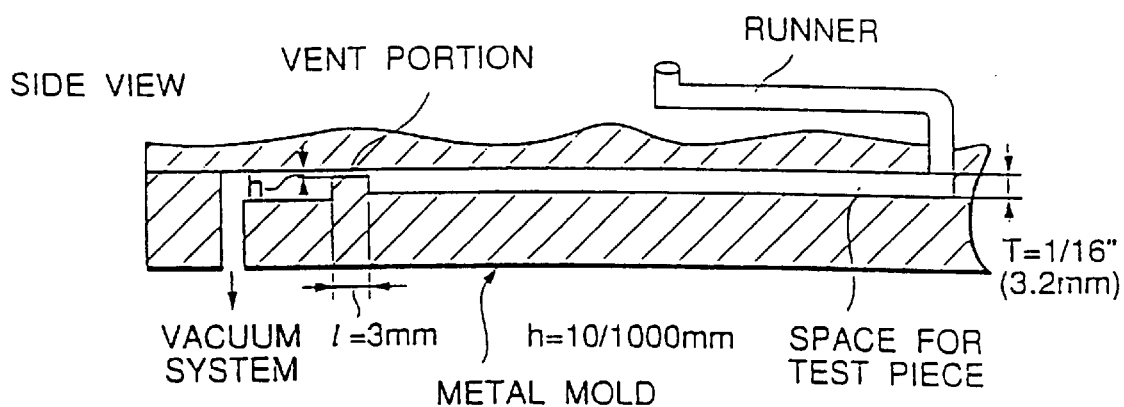

According to the present invention, an important feature resides in that a particular semiaromatic polyamide (A) is selected out of the semiaromatic polyamides, and this semiaromatic polyamide (A) is blended with a particular polyamide (B) (e.g., nylon 12) and a particular graft-modified product (C). Employment of this combination makes it possible to improve the ejectability (easiness for molded parts to be ejected from the mold), to decrease the amount of oligomer precipitated in the molded article, and to suppress the vent holes of the metal mold from being clogged, enabling the molding to be carried out for extended periods of time.

The semiaromatic polyamide resin composition of the present invention exhibits good fluidity and makes it possible to lower the molding temperature. Besides, the semiaromatic polyamide resin composition of the present invention exhibits excellent anti-creeping property under high temperature and high humidity conditions, resistance against aging by heat, resistance against thermal deformation and shock resistance. Despite of suppressing a drop in the toughness, the semiaromatic polyamide resin composition does not almost lose other excellent properties inherent in the aromatic polyamide, such as mechanical strength, low water-absorbing property, and the like properties.

Semiaromatic Polyamide (A)

The semiaromatic polyamide (A) used in the present invention has a main constituent component unit constituted by a recurring unit of [a] a particular dicarboxylic acid component unit and [b] a particular aliphatic diamine component unit.

When the amount of the whole dicarboxylic acid components in the polyamide is 100 mol %, the semiaromatic polyamide (A) contains the terephthalic acid component unit (a-1) in an amount of from 45 to 100 mol %, preferably, from 50 to 90 mol % and, more preferably, from 60 to 80 mol %. The semiaromatic polyamide further contains the aromatic dicarboxylic acid component unit (a-2) other than the terephthalic acid in an amount of from 0 to 55 mol %, preferably, from 0 to 40 mol % and, more preferably, from 0 to 30 mol %. The semiaromatic polyamide further contains the aliphatic dicarboxylic acid component unit (a-3) in an amount of from 0 to 55 mol %. The semiaromatic polyamide exhibits excellent moldability since it contains the aliphatic dicarboxylic acid component unit (a-3) in a small amount, concretely in an amount of from 10 to 50 mol % and, more preferably, from 20 to 40 mol %. When the content of the aliphatic dicarboxylic acid component unit exceeds 55 mol %, the content of the terephthalic acid component unit becomes inevitably smaller than 45 mol %. Such a semiaromatic polyamide exhibits a high water-absorbing factor and its melting point tends to become lower than 280° C. Therefore, the molded article formed of such a semiaromatic polyamide exhibits a large dimensional change due to the absorption of water or exhibits insufficient heat resistance, which is not suited for the present invention.

The diamine component unit [b] forming the recurring unit together with the dicarboxylic acid component unit, is a straight-chain alkylene diamine component unit having 4 to 18 carbon atoms and/or an alkylenediamine component unit having a side-chain alkyl group and 4 to 18 carbon atoms.

Among them, it is desired that the semiaromatic polyamide used in the present invention contains the straight-chain aliphatic alkylenediamine component unit (b-1) having 4 to 18 carbon atoms in an amount of from 55 to 99 mol %, preferably, from 70 to 98 mol % and, particularly preferably, from 80 to 95 mol % per 100 mol % of the whole diamine component units. The semiaromatic polyamide further contains the alkylenediamine component unit (b-2) having a side-chain alkyl group and 4 to 18 carbon atoms, in an amount of from 1 to 45 mol %, preferably, from 2 to 30 mol % and, particularly preferably, from 5 to 20 mol %. When the two kinds of particular alkylenediamine component units are contained in the above-mentioned amounts, the melting point of the semiaromatic polyamide which is the main component of the composition of the present invention is lowered down to a degree that does not cause gas-burning to the molded article (or the molten polyamide) at the time of the injection-molding, which is particularly desirable. Besides, the white powder precipitates little in the metal mold, i.e., the mold deposit decreases. Besides, the polyamide has Tg which is as high as 100° C. or more and exhibits excellent anti-creeping property under high temperature and high humidity conditions.

That is, when the content of the straight-chain alkylenediamine component unit (b-1) having 4 to 18 carbon atoms is not larger than 99 mol %, it is more difficult that the precipitation of the white powder, i.e., the mold deposit occurs during the injection molding. When the content of the alkylenediamine component unit (b-2) having a side-chain alkyl group and 4 to 18 carbon atoms is not larger than 45 mol %, the rate of crystallization of the semiaromatic polyamide does not becomes small, and heat resistance becomes good.

The semiaromatic polyamide recurring unit comprising the dicarboxylic acid component unit and the diamine component unit can be represented by the following formula. The recurring unit forming the semiaromatic polyamide has a terephthalic acid component unit (a-1) as the dicarboxylic acid component unit [a] which is an indispensable component unit. The recurring unit having such a terephthalic acid component unit (a-1) is represented by the following formula [I-a],

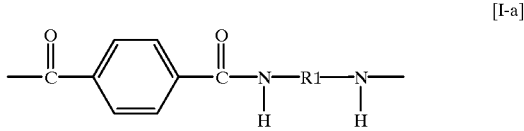

[I-a]

wherein R1 is an alkylene group having 4 to 18 carbon atoms and which may have a side chain.

The dicarboxylic acid component unit [a] do not have to entirely be the component unit represented by the above formula [I-a] but in which the terephthalic acid component unit (a-1) may be partly replaced by other dicarboxylic acid components.

The carboxylic acid component units other than the terephthalic acid component include an aromatic dicarboxylic acid component unit (a-2) other than the terephthalic acid and an aliphatic dicarboxylic acid component unit (a-3).

As the aromatic dicarboxylic acid component unit (a-2) other than the terephthalic acid, there can be exemplified an isophthalic acid component unit, a 2-methylterephthalic acid component unit, and a naphthalenedicarboxylic acid component unit. As the component unit derived from the aromatic dicarboxylic acid other than the terephthalic acid, the isophthalic acid component unit is particularly preferred.

Among the aromatic dicarboxylic acid component units (a-2) other than the terephthalic acid, a recurring unit having a particularly preferred isophthalic acid component unit of the present invention is expressed by the following formula [I-b],

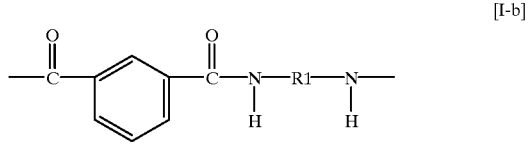

wherein R1 is an alkylene group having 4 to 18 carbon atoms and which may have a side chain.

The aliphatic dicarboxylic acid component unit (a-3) is derived from an aliphatic dicarboxylic acid having 4 to 20 carbon atoms and, preferably, from 6 to 12 carbon atoms. Examples of the aliphatic dicarboxylic acid include succinic acid, adipic acid, azelaic acid and sebacic acid. Preferred examples of the aliphatic dicarboxylic acid component unit include an adipic acid component unit and a sebacic acid component unit. Among them, the adipic acid is preferred.

The recurring unit having the aliphatic dicarboxylic acid component unit (a-3) which is the other dicarboxylic acid component unit constituting the dicarboxylic acid component unit [a] is represented by the following formula [II],

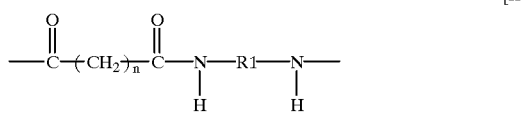

wherein R1 is an alkylene group having 4 to 18 carbon atoms which may have a side chain, and n is an integer of usually 2 to 18 and, preferably, 4 to 10.

The diamine component unit [b] forming the semiaromatic polyamide used in the present invention is a straight-chain alkylenediamine component unit (b-1) having 4 to 18 carbon atoms and/or an alkylenediamine component unit (b-2) having a side-chain alkyl group and 4 to 18 carbon atoms.

Concrete examples of the straight-chain alkylenediamine component unit (b-1) include 1,4-diaminobutane, 1,6-diaminohexane, 1,7-diaminoheptane, 1,8-diaminooctane, 1,9-diaminononane, 1,10-diaminodecane, 1,11-diaminoundecane, and 1,12-diaminododecane. Among them, it is desired to use the component units derived from 1,6-diaminohexane, 1,8-diaminooctane, 1,10-diaminodecane and 1,12-diaminododecane. The semiaromatic polyamide used in the present invention may contain plural kinds of these component units. Among them, a component unit derived from the 1,6-diaminohexane is particularly preferred.

Concrete examples of the alkylenediamine component unit (b-2) having a side-chain alkyl group and 4 to 18 carbon atoms include component units derived from 1-butyl-1,2-diaminoethane, 1,1-dimethyl-1,4-diaminobutane, 1-ethyl-1,4-diaminobutane, 1,2-dimethyl-1,4-diaminobutane, 1,3-dimethyl-1,4-diaminobutane, 1,4-dimethyl-1,4-diaminobutane, 2,3-dimethyl-1,4-diaminobutane, 2-methyl-1,5-diaminopentane, 2,5-dimethyl-1,6-diaminohexane, 2,4-dimethyl-1,6-diaminohexane, 3,3-dimethyl-1,6-diaminohexane, 2,2-dimethyl-1,6-diaminohexane, 2,2,4-trimethyl-1,6-diaminohexane, 2,4,4-trimethyl-1,6-diaminohexane, 2,4-diethyl-1,6-diaminohexane, 2,3-dimethyl-1,7-diaminoheptane, 2,4-dimethyl-1,7-diaminoheptane,2,5-dime-hyl-1,7-diaminoheptane, 2,2-dimethyl-1,7-diaminoheptane, 2-methyl-4-ethyl-1,7-diaminoheptane, 2-ethyl-4-methyl-1,7-diaminoheptane, 2,2,5,5-tetramethyl-1,7-diaminoheptane, 3-isopropyl-1,7-diaminoheptane, 3-isooctyl-1,7-diaminoheptane, 2-methyl-1,8-diaminooctane, 1,3-dimethyl-1,8-diaminooctane, 1,4-dimethyl-1,8-diaminooctane, 2,4-dimethyl-1,8-diaminooctane, 3,4-dimethyl-1,8-diaminooctane, 4,5-dimethyl-1,8-diaminooctane, 2,2-dimethyl-1,8-diaminooctane, 3,3-dimethyl-1,8-diaminooctane, 4,4-dimethyl-1,8-diaminooctane, 3,3,5-trimethyl-1,8-diaminooctane, 2,4-diethyl-1,8-diaminooctane, and 5-methyl-1,9-diaminononane.

In the present invention, the number of carbon atoms of the alkylenediamine component unit having a side-chain alkyl group is the sum of the number of carbon atoms of the main-chain alkylene group and the number of carbon atoms of the side-chain alkyl group unless stated otherwise. Among the alkylenediamine component units having a side-chain alkyl group, it is desired to use a component unit derived from the side-chain alkyldiamine having 1 to 2 side-chain alkyl groups with 1 to 2 carbon atoms and having 4 to 10 carbon atoms on the main chain. It is further desired to use a 2-methyl-1,5-diaminopentane component unit and a 2-methyl-1,8-diaminooctane component unit.

The recurring unit having a component unit derived from the 2-methyl-1,5-diaminopentane which is the particularly preferred side-chain alkyldiamine of the present invention is represented by the following formula [III],

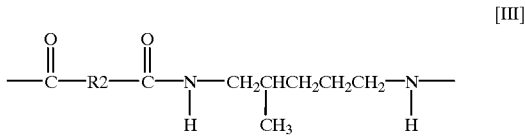

wherein R2 is a divalent hydrocarbon group such as p-phenylene group, m-phenylene group or alkylene group under a condition in which from 45 to 100 mol % thereof is the p-phenylene group.

The semiaromatic polyamide used in the present invention may include, as a dicarboxylic acid component unit, a terephthalic acid component unit which is the above-mentioned main component unit, a component unit derived from a divalent aromatic carboxylic acid other than the terephthalic acid, as represented by the isophthalic acid component unit, or a component unit derived from a small amount of tribasic or more highly basic polyhydric carboxylic acid such as trimellitic acid or pyromellitic acid. The polyamide may contain 0 to 5 mol % of the component unit derived from such a polyhydric carboxylic acid.

The semiaromatic polyamide used in the present invention has an intrinsic viscosity [η] as measured in concentric sulfuric acid heated at 30° C. of, usually, from 0.5 to 3.0 dl/g, preferably, from 0.5 to 2.8 dl/g and, particularly preferably, from 0.6 to 2.5 dl/g.

The above-mentioned semiaromatic polyamide exhibits a melting point higher than that of the aliphatic polyamide that has heretofore been used. In many cases, the melting point lies over a range of from 280 to 330° C. and, preferably, over a range of from 280 to 310° C. and, more preferably, over a range of from 290 to 305° C. When the semiaromatic polyamide is prepared by blending two or more kinds of polyamides as will be described later, the melting point can be observed by measuring the blend of two or more kinds of polyamides by using a DSC, or by measuring the composition containing all of the components (A) to (C) by using the DSC. The semiaromatic polyamide has a particularly excellent heat resistance, a low water-absorbing factor, and is little crystallized after the molded product is annealed. The glass transition temperature in the amorphous portion is usually not lower than 80° C., preferably, from 90 to 150° C. and, more preferably, from 100 to 150° C. Therefore, the semiaromatic polyamide exhibits excellent anti-creep-deforming property and little contaminates the metal mold.

The semiaromatic polyamide used in the present invention is prepared by the polycondensation of a dicarboxylic acid component with a diamine component. Concretely, the semiaromatic polyamide is prepared by blending together the terephthalic acid or aromatic dicarboxylic acid other than the terephthalic acid, aliphatic dicarboxylic acid, straight-chain dialkylenediamine and/or alkylenediamine having a side-chain alkyl group in the above-mentioned amounts in an aqueous medium, heating the mixture under the application of pressure in the presence of a catalyst such as sodium hypophosphite thereby to prepare a polyamide precursor and, then, melt-kneading the polyamide precursor. In preparing the polyamide precursor, a molecular weight-adjusting agent such as benzoic acid may be blended.

The semiaromatic polyamide can be further prepared by separately preparing a polyamide having a side-chain alkyl group and a polyamide without side-chain, and melt-kneading them together to conduct the amide-exchanging reaction.

The semiaromatic polyamide used in the present invention can be further prepared by adjusting the blending amounts of at least two kinds of polyamides having different compositions in a manner that the dicarboxylic acid component unit and the diamine component unit lie within the above-mentioned ranges, and melt-kneading them together.

Representative examples of the above-mentioned semiaromatic polyamide (A) include: (A-1): A polyamide in which the dicarboxylic acid component unit comprises from 45 to 100 mol % of a terephthalic acid component unit, from 0 to 55 mol % of an aromatic dicarboxylic acid component unit other than the terephthalic acid and/or from 0 to 55 mol % of an aliphatic dicarboxylic acid component unit having 4 to 20 carbon atoms, and the diamine component unit comprises 100 mol % of a straight-chain alkylenediamine component unit having 4 to 18 carbon atoms (hereinafter referred to as "straight-chain polyamide"); and (A-2): A polyamide in which the dicarboxylic acid component comprises from 45 to 100 mol % of a terephthalic acid component unit, from 0 to 55 mol % of an aromatic dicarboxylic acid component other than the terephthalic acid and/or from 0 to 55 mol % of an aliphatic dicarboxylic acid component unit having 4 to 20 carbon atoms, and the diamine component unit comprises from 5 to 95 mol % of a straight-chain alkylenediamine component unit having 4 to 18 carbon atoms and from 5 to 95 mol % of an alkylenediamine component unit having a side-chain alkyl group and 4 to 18 carbon atoms (hereinafter referred t as "side-chain polyamide").

The straight-chain polyamide (A-1) and the side-chain polyamide (A-2) may be used in combination being melt-kneaded together.

Examples of the straight-chain polyamide (A-1) include:
(A-1-1): A polyamide comprising the constituent component units of the above-mentioned formulas [I-a] and [II]. Here, the groups R1 in the formulas [I-a] and [II] are all straight-chain alkylene groups (with 4 to 18 carbon atoms). It is desired that the amount of the unit [I-a] is not smaller than 45 mol %, preferably, from 45 to 70 mol % and, most preferably, from 45 to 60 mol %, and the amount of the unit [II] is not larger than 55 mol %, preferably, from 55 to 30 mol % and, most preferably, from 55 to 40 mol %;

(A-1-2): A polyamide comprising the constituent component units of the above-mentioned formulas [I-a], [I-b] and [II]. Here, the groups R1 in the formulas [I-a], [I-b] and [II] are all straight-chain alkylene groups (with 4 to 18 carbon atoms). It is desired that the amount of the unit [I-a] is from 50 to 80 mol %, preferably, from 60 to 70 mol %, the amount of the unit [I-b] is from 10 to 40 mol %, preferably, from 20 to 30 mol %, and the amount of the unit [II] is from 30 to 5 mol % and, preferably, from 20 to 10 mol %; and (A-1-3): A polyamide comprising the constituent component units of the above-mentioned formulas [I-a] and [I-b]. Here, the groups R1 in the formulas [I-a] and [I-b] are all straight-chain alkylene groups (with 4 to 18 carbon atoms). It is desired that the amount of the unit [I-a] is from 50 to 80 mol % and, preferably, from 60 to 70 mol %, and the amount of the unit [I-b] is from 10 to 40 mol % and, preferably, from 20 to 30 mol %.

Examples of the side-chain polyamide (A-2) include:
(A-2-1): A polyamide comprising the constituent component units of the above-mentioned formulas [I-a] and [III]. Here, the group R1 in the formula [I-a] is a straight-chain alkylene group (with 4 to 18 carbon atoms), and the group R2 in the formula [III] is a p-phenylene group. It is desired that the amount of the unit [I-a] is from 5 to 95 mol %, preferably, from 30 to 70 mol % and, most preferably, from 40 to 60 mol %, and the amount of the unit [III] is from 95 to 5 mol %, preferably, from 70 to 30 mol % and, most preferably, from 60 to 40 mol %; and (A-2-2): A polyamide comprising the constituent component units of the above-mentioned formulas [I-a], [I-b] and [III]. Here, the groups R1 in the formulas [I-a] and [I-b] are straight-chain alkylene groups (with 4 to 18 carbon atoms), and the group R2 in the formula [III] is a p-phenylene group. It is desired that the amount of the unit [I-a] is from 25 to 65 mol % and, preferably, from 30 to 50 mol %, the amount of the unit [I-b] is from 5 to 30 mol % and, preferably, from 10 to 20 mol %, and the amount of the unit [III] is from 30 to 70 mol % and, preferably, from 40 to 60 mol %.

Concrete examples are:
(A-1-1): TA/AA/HMDA,
(A-1-2): TA/IA/HMDA,
(A-1-3): TA/IA/AA or SA/HMDA,
(A-2-1): TA/HMDA/MPMDA,
  TA/AA/HMDA/MPMDA,
  TA/NMDA/MDAO,
  TA/AA/NMDA/MDAO,
(A-2-2): TA/IA/HMDA/MPMDA,
  TA/IA/NMDA/MDAO.
Here,
TA: terephthalic acid,
IA: isophthalic acid,
AA: adipic acid,
SA: sebacic acid, HMDA: hexamethylenediamine(1,6-diaminohexane),
MPMDA: 2-methyl-1,5-pentamethylenediamine,
NMDA: nonamethylenediamine(1,9-diaminononane),
MDAO: 2-methyl-1,8-diaminooctane.

Among the above-mentioned polyamides (A), the present invention preferably employs (A-2-1) and (A-2-2).

The above-mentioned straight-chain polyamide (A-1) and the side-chain polyamide (A-2) can be used alone as the component (A), depending on the composition. When the straight-chain polyamide (A-1) and the side-chain polyamide (A-2) are used in combination as the semiaromatic polyamide (A), however, it is desired that the straight-chain polyamide (A-1) is used in an amount of not smaller than 45 parts by weight and, particularly, in an amount of from 50 to 95 parts by weight, and the side-chain polyamide (A-2) is used in an amount of not smaller than 5 parts by weight and, particularly, in an amount of from 5 to 50 parts by weight. Among them, when the semi-aromatic polyamide (A) is to be prepared from the straight-chain polyamide (A-1-1) and the side-chain polyamide (A-2-1), it is desired that (A-1-1) is used in an amount of from 45 to 95% by weight, preferably, from 60 to 90% by weight and, most preferably, from 70 to 85% by weight, and (A-2-1) is used in an amount of from 55 to 5% by weight, preferably, from 40 to 10% by weight and, most preferably, from 30 to 15% by weight.

In these ranges, it is allowed to obtain a semiaromatic polyamide resin composition exhibiting excellent anti-creeping property and little precipitating the white powder.

The semiaromatic polyamide (A) is used in an amount of from 98 to 65% by weight and, particularly, from 88.5 to 76% by weight per the sum (A+B+C) of the semiaromatic polyamide (A), polyamide (B) and graft-modified product (C) that will be described below.

Polyamide (B)

In the present invention, the polyamide (B) that is used in combination with the above-mentioned semiaromatic polyamide (A) has at least the one selected from the group constituting of (i) a constituent unit derived from a lactam having 12 carbon atoms, (ii) a constituent unit derived from an aminocarboxylic acid having 12 carbon atoms and (iii) a constituent unit derived from a dodecanoic diacid and a diamine. Here, as the diamine, an aliphatic diamine may preferably be used. As the aliphatic diamine, the same diamine as explained for the component (A) may be used. Preferably a straight-chain diamine, more preferably a straight-chain diamine having 6 to 12 carbon atoms, may be used. As the polyamide (B), a nylon 12 obtained by the ring-opening polycondensation of a lactam 12-aminododecanoate or by the polycondensation of a 12-aminododecanoic acid, or nylons 6, 12, etc., obtained by the polycondensation of the hexamethylenediamine and the dodecanoic diacid, can be exemplified. In the present invention, a polyamide having a constituent unit derived from a lactam or an aminocarboxylic acid, having 12 carbon atoms, is preferable.

According to the present invention, use of the polyamide (B) in combination with the above-mentioned semiaromatic polyamide (A) makes it possible to improve the metal mold releasing property during the molding operation. As will be learned from Comparative Examples appearing later, it is not allowed to improve the metal mold releasing property when a polyamide obtained from a lactam or from an aminocarboxylic acid having a different number of carbon atoms is used (Comparative Example 3), when a polyamide obtained from the diamine and the dicarboxylic acid, like the nylon 6,6 is used (Comparative Example 2). The metal mold releasing property is rather impaired as compared with when the semiaromatic polyamide (A) alone is used (Comparative Example 1).

In the present invention, it is important to blend the above-mentioned polyamide (B) with the semiaromatic polyamide (A) and a modified ethylene/α-olefin copolymer (C) that will be described later. The polyamide (B) is used in an amount of from 1 to 10% by weight and, particularly, from 1.5 to 4% by weight per the sum (A+B+C) of the semiaromatic polyamide (A), polyamide (B) and modified ethylene/α-olefin copolymer (C). When the amount of the polyamide (B) is smaller than the above-mentioned range, it is not allowed to sufficiently improve the metal mold ejectability. When the amount of the polyamide (B) is larger than the above-mentioned range, it becomes difficult to prevent the precipitation of the white powder, and the anti-creeping property is lost. When the unit derived from the above-mentioned lactam or the aminocarboxylic acid having 12 carbon atoms, is incorporated in the semiaromatic polyamide (A) by the copolymerization and the component (B) is not compounded, it becomes difficult to improve the metal mold ejectability as taught in Comparative Example 4.

The above-mentioned polyamide (B) may contain units derived from other lactam, aminocarboxylic acid than that having 12 carbon atoms, or units derived from other dicarboxylic acid and diamine than dodecanoic acid and diamine, so far as the object of the present invention for improving the metal mold ejectability is not impaired. Such other units may be contained usually in an amount of not larger than 50 mol %, preferably, smaller than 20 mol %, more preferably, smaller than 5 mol % and, most preferably, smaller than 1 mol %. Namely, a constituent unit derived from a lactam having 12 carbon atoms, a constituent unit derived from an aminocarboxylic acid having 12 carbon atoms or a constituent unit derived from a dodecanoic diacid and a diamine may be contained in an amount of not smaller than 50 mol %, preferably, not smaller than 80 mol %, more preferably, not smaller than 95 mol %, most preferably, not smaller than 99 mol %. Particularly preferably, the other components are not substantially copolymerized.

Generally, the polyamide (B) used in the present invention has an intrinsic viscosity [η] as measured in the concentrated sulfuric acid at 30° C. of from 0.3 to 4 dl/g, preferably, from 0.4 to 3 dl/g and, most preferably, from 0.6 to 1.5 dl/g. It is further desired that the polyamide (B) has a flexural modulus of elasticity of not smaller than 1300 MPa and, particularly, from 1400 MPa to 2000 MPa as measured in the form of an injection-molded test piece in compliance with ASTM D 790.

Graft-Modified Product (C)

In addition to the above-mentioned semiaromatic polyamides (A) and (B), the present invention uses at least one kind of graft-modified product (C) selected from the group consisting of a graft-modified ethylene/α-olefin copolymer (C-1), graft-modified aromatic vinyl compound/conjugated diene copolymer (C-2) and a graft-modified product of a hydrogenated product of the aromatic vinyl compound/conjugated diene copolymer (C-3). Upon blending the component (C), it is allowed to ore effectively prevent the precipitation of the white powder during the molding and to effectively prevent contamination to the metal mold.

It is desired that the graft-modified product (C) is used in an amount of from 1 to 25% by weight and, preferably, from 10 to 20% by weight per the sum (A+B+C) of the components (A), (B) and (C).

The graft-modified product (C) is obtained by graft-modifying an ethylene/α-olefin copolymer [C1], an aromatic vinyl compound/conjugated diene copolymer [C2] or a hydrogenated product [C3] of the aromatic vinyl compound/conjugated diene copolymer with an unsaturated carboxylic acid or a derivative thereof.

The graft-modified product (C) and, particularly, the graft-modified ethylene/α-olefin copolymer has a density over a range of from 0.85 to 0.95 g/cm$^3$, preferably, from 0.89 to 0.95 g/cm$^3$, more preferably, from 0.90 to 0.94 g/cm$^3$ and, most preferably, from 0.91 to 0.93 g/cm$^3$. Within these ranges, it is allowed to obtain a composition that exhibits excellent anti-creeping property precipitating the white powder little.

The ethylene/α-olefin copolymer [C1] subjected to the graft modification comprises an ethylene and an α-olefin and, particularly, an α-olefin having 3 to 20 carbon atoms.

The ethylene content in the ethylene/α-olefin copolymer [C1] is not smaller than 70 mol % and, preferably, from 80 to 98 mol %.

Concrete examples of the α-olefin include propylene, 1-butene, 1-pentene, 1-hexene, 4-methyl-1-pentene, 1-octene, and 1-decene. Among them, 1-butene, 1-hexene, 4-methyl-1-pentene and 1-octene are preferably used. These α-olefins can be used in a single kind or being combined together in two or more kinds.

It has been confirmed that the density of the ethylene/α-olefin copolymer [C1] does not almost change before and after the graft-modification. It is therefore desired that the ethylene/α-olefin copolymer used as the starting material has the density same as that of the graft-modified product or, concretely, has the density of from 0.85 to 0.95 g/cm$^3$, preferably, from 0.89 to 0.95 g/cm$^3$, more preferably, from 0.90 to 0.94 g/cm$^3$ and, most preferably, from 0.91 to 0.93 g/cm$^3$.

The ethylene/α-olefin copolymer [C1] has a temperature (melting point Tm) at a maximum peak position on an endothermic curve as measured by a differential scanning calorimeter (DSC) of, usually, from 90 to 127° C. and, preferably, from 95 to 120° C. It is, however, also allowable to use an amorphous ethylene/α-olefin copolymer that does not exhibit a melting point.

Besides, the ethylene/α-olefin copolymer [C1] has a degree of crystallization as measured by an X-ray diffraction method of, usually, from 20 to 60% and, preferably, from 25 to 55% and, most preferably, from 30 to 50%. It is, however, also allowable to use the amorphous ethylene/α-olefin copolymer as described above.

Further, the melt-flow rate (MFR; ASTM D 1238, 190° C., load of 2.16 kg) of the ethylene/α-olefin copolymer [C1] is, usually, from 0.01 to 100 g/10 min., preferably, from 0.1 to 50 g/10 min., and, more preferably, from 0.2 to 20 g/10 min.

The ethylene/α-olefin copolymer [C1] having the above-mentioned properties can be prepared by a known method using a catalyst of the type of titanium (Ti), vanadium (V) or zirconium (Zr).

The graft-modified aromatic vinyl hydrocarbon/conjugated diene copolymer (C-2) or a hydrogenated product (C-3) thereof blended in the composition of the present invention is a random copolymer or a block copolymer of an aromatic vinyl hydrocarbon and a conjugated diene compound, or a hydrogenated product of these copolymers graft-modified with an unsaturated carboxylic acid or a derivative thereof.

Concrete examples of the aromatic vinyl hydrocarbon/conjugated diene copolymer [C2] or the hydrogenated product [C3] thereof used for the preparation of the modified product include styrene/butadiene block copolymer rubber, styrene/butadiene/styrene block copolymer rubber, styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber and styrene/butadiene random copolymer rubber.

In these copolymers, the molar ratio (aromatic vinyl hydrocarbon/conjugated diene) of the recurring unit derived from the conjugated diene to the recurring unit derived from the aromatic vinyl hydrocarbon, is usually from 10/90 to 70/30. The hydrogenated copolymer rubber is a copolymer obtained by hydrogenating part or whole of double bonds remaining in the copolymer rubber.

The aromatic vinyl hydrocarbon/conjugated diene copolymer or a hydrogenated product thereof has an intrinsic viscosity [η] as measured in decalin heated at 135° C. of, usually, from 0.01 to 10 dl/g and, preferably, from 0.08 to 7 dl/g, and a glass transition temperature (Tg) of, usually, not higher than 0° C., preferably, not higher than −10° C. and, particularly preferably, not higher than −20° C. Further, the degree of crystallization as measured by the X-ray diffraction method is from 0 to 10%, preferably, from 0 to 7% and, particularly preferably, from 0 to 5%.

The graft-modified product (C) used in the present invention has a grafting amount of unsaturated carboxylic acid or a derivative thereof of from 0.01 to 5% by weight and, preferably, from 0.1 to 3% by weight per 100% by weight of the graft-modified product (C).

Concrete examples of the unsaturated carboxylic acid grafted onto the base polymers [C1, C2, C3] are acrylic acid, methacrylic acid, maleic acid, fumaric acid and itaconic acid. Derivatives of the unsaturated carboxylic acid are acid anhydride, ester, amide, imide, metal salt and the like. Concrete examples include maleic anhydride, itaconic anhydride, citraconic anhydride, methyl acrylate, methyl methacrylate, ethyl acrylate, ethyl methacrylate, glycidyl acrylate, monoethylester of maleic acid, diethylester of maleic acid, monomethylester of fumaric acid, dimethylester of fumaric acid, monomethylester of itaconic acid, diethylester of itaconic acid, acrylamide, methacrylamide, monoamide of maleic acid, diamide of maleic acid, N-monoethylamide of maleic acid, N,N-diethylamide of maleic acid, N-monobutylamide of maleic acid, N,N-dibutylamide of maleic acid, monoamide of fumaric acid, diamide of fumaric acid, N-monobutylamide of fumaric acid, N,N-dibutylamide of fumaric acid, maleimide, N-butylmaleimide, N-phenylmaleimide, sodium acrylate, sodium methacrylate, potassium acrylate and potassium methacrylate. Among these grafted monomers, it is most desired to use maleic anhydride.

The above-mentioned unsaturated carboxylic acid or a derivative thereof (graft monomer) can be graft-modified onto the base polymers [C1, C2, C3] based on various known methods.

For example, a melt modification method in which the base polymers [C1, C2, C3] are melted by using the extruder, and to which a graft monomer is added so as to be graft-copolymerized, and a solution modification method in which the base polymers [C1, C2, C3] are dissolved in a solvent, and to which a graft monomer is added so as to be graft-copolymerized. In either case, it is desired to start the reaction in the presence of a radical initiator to efficiently graft-copolymerize the graft monomer.

As the radical initiator, an organic peroxide or an organic perester can be preferably used. Concrete examples include organic peroxides such as benzoyl peroxide, dichlorobenzoyl peroxide; dicumyl peroxide; di-tert-butyl peroxide; 2,5-dimethyl-2,5-di(peroxide benzoate)hexyne-3; 1,4-bis (tert-butylperoxyisopropyl)benzene; and lauroyl peroxide; organic peresters such as tert-butyl peracetate; 2,5-dimethyl-2,5-di(tert-butylperoxy)hexyne-3; 2,5-dimethyl-2,5-di(tert-butylpe:-oxy)hexane; tert-butyl perbenzoate; tert-butylperphenyl acetate; tert-butyl perisobutylate; tert-butylper-sec-octoate; tert-butyl perpivalate; cumyl perpivalate; tert-butylperdiethyl acetate; and azo compounds such as azoisobutylonitrile and dimethylazoisobutylate. Among them, it is desired to use dialkyl peroxides such as dicumyl peroxide; di-tert-butyl peroxide; 2,5-dimethyl-2,5-di(peroxybenzoate)hexyne-3; 2,5-dimethyl-2,5-di(tert-butylperoxy)hexane; and 1,4-bis(tert-butylperoxyisopropyl) benzene.

The above-mentioned radical initiator is used at a ratio of, usually, from 0.001 to 1 part by weight per 100 parts by weight of the base polymers [C1, C2, C3].

In carrying out the grafting reaction, other monomers such as styrene may be made present therein.

Polyamide Resin Composition

The polyamide resin composition of the present invention contains the above-mentioned components (A) and (B) as essential components, and is, as required, melt-blended with the component (C). The polyamide resin composition exhibits a melting point (Tm) over a temperature range of from 165 to 230° C. and, preferably, from 165 to 185° C. as measured by using the differential scanning calorimeter (DSC). This melting point can be observed in a state of a composition or in a state of a molded article.

As required, furthermore, the composition may be blended with an organic flame retarder such as brominated polystyrene having, as a main constituent component, the structural unit of the following formula [IV],

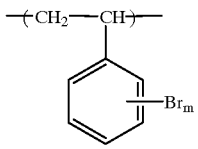

[IV]

wherein m is a number of not smaller than 1 but not larger than 5, produced from a brominated styrene monomer, brominated product of polyethylene ether and brominated product of polystyrene.

The brominated polystyrene contains the styrene dibromide unit preferably in an amount of not smaller than 60% by weight and, particularly preferably, in an amount of not smaller than 70% by weight. The brominated polystyrene may contain styrene monobromide and/or styrene tribromide in an amount of not larger than 40% by weight and, preferably, not larger than 30% by weight in addition to containing the styrene dibromide.

The amount of addition of the organic flame retarder is from 0 to 60 parts by weight, preferably, from 1 to 20 parts by weight and, particularly preferably, from 2 to 15 parts by weight per 100 parts by weight of the semiaromatic polyamide (A). To obtain the flame retarding property to a sufficient degree, it is desired that the flame retarder is contained in an amount of from about 40 to about 60 parts by weight.

In addition to the above-mentioned organic flame retarder, the semiaromatic polyamide resin composition of the present invention may further use at least one kind of an assistant for the flame retarder selected from antimony oxide, sodium antimonate, tin oxide, iron oxide, zinc oxide and zinc nitrate. Among them, it is desired to use sodium antimonate and, particularly, substantially anhydrous sodium antimonate heat-treated at a temperature as high as 550° C. or higher.

The assistant for the flame retarder is added in an amount of from 0 to 10 parts by weight and, preferably, from 2 to 8 parts by weight.

As required, furthermore, the semiaromatic polyamide resin composition of the present invention may be blended with a heat resisting resin such as PPS (polyphenylene sulfide), PPE (polyphenylether), PES (polyestersulfone), PEI (polyetherimide), LCP (liquid crystal polymer) and modified products of these resins. Among them, the polyphenylene sulfide is particularly desired.

The semiaromatic polyamide resin composition of the present invention is blended with the above-mentioned heat resisting resin in an amount of, usually, smaller than 50% by weight and, preferably, from 0 to 40% by weight.

Moreover, the semiaromatic polyamide resin composition of the present invention may be blended with an antioxidant (heat stabilizer) such as phosphorus-type antioxidant, phenol-type antioxidant, amine-type antioxidant, sulfur-type antioxidant, copper compound and halogenated alkali metal compound.

Examples of the phosphorus-type antioxidant include 9,10-dihydro-9-oxa-10-phosphurphenanthrene-10 oxide, triphenyl phosphite, 2-ethylhexyl phosphate, dilauryl phosphite, tri-iso-octyl phosphite, tris(2,4 -di-tert-butylphenyl)phosphite, trilauryl phosphite, trilauryl-di-thiophosphate, trilauryl-tri-thiophosphite, trisnonylphenyl phosphite, distearylpentaerythritol diphosphite, tris (monononylphenyl) phosphite, tris(dinonylphenyl) phosphite, trioctadecyl phosphite, 1,1,3-tris(2-methyl-di-tridecylphosphite-5-tert-butylphenyl)butane, 4,4'-butylidene-bis(3-methyl-6-tert-butyl)tridecyl phosphite, 4,4'-butylidene-bis(3-methyl-6-tert-butyl-di-tridecyl) phosphite, bis(2,4-di-tert-butylphenyl)pentaerythritol-di-phosphite, bis(2,6-di-tert-butyl-4-methylphenyl) pentaerythritol-di-phosphite, tetrakis(2,4-di-tert-butylphenyl) 4,4'-bisphenylene diphosphite, distearyl pentaerithritol disphosphite, tridecyl phosphite, tristearyl phosphite, 2,2'-methylenebis(4,6-di-tert-butylphenyl)octyl phosphite, sorbit-tris-phosphite-distearyl-mono-C30-diol ester, and bis(2,4,6-tri-tert-butylphenyl)pentaerithritol dis-phosphite. Among them, it is desired to use pentaerithritol-di-phosphite type phosphorus antioxidants such as bis(2,4-di-tert-butylphenyl)pentaerithritol-di-phosphite and bis(2,6-di-tert-butyl-4-methylphenyl)pentaerithritol-di-phosphite, as well as tetrakis(2,4-di-tert-butylphenyl) 4,4'-bisphenylene diphosphite.

Examples of the phenol-type antioxidant include 3,9-bis{2-[3-(3-tert-butyl-4-hydroxy-5-methylphenyl) propionyl]-1,1-dimethylethyl}-2,4,8,10-tetraoxaspiro[5,5] undecane, 2,6-di-tert-butyl-p-cresol, 2,4,6-tri-tert-butylphenol, n-octadecyl-3-(4'-hydroxy-3',5'-di-tert-butylphenol)propionate, styrenated phenol, 4-hydroxy-methyl-2,6-di-tert-butylphenol, 2,5-di-tert-butyl-hydroquinone, cyclohexylphenol, butylhydroxyanisole, 2,2'-methylene-bis-(4-methyl-6-tert-butylphenol), 2,21-methylene-bis-(4-ethyl-6-tert-butylphenol), 4,4'-iso-propylidene bisphenol, 4,4'-butylidene-bis(3-methyl-6 -tert-butylphenol), 1,1-bis-(4-hydroxyphenyl)cyclohexane, 4,4'- methylene-bis(2,6-di-tert-butylphenol), 2,6-bis(2'-hydroxy-3'-tert-butyl-5'-methylmethylbenzyl)-4-methyl phenol, 1,1,3-tris(2-methyl-4-hydroxy-5-tert-butylphenyl)butane, 1,3,5-tris-methyl-2,4,6-tris(3,5-di-tert-butyl-4-hydroxybenzyl) benzene, tetrakis[methylene-3-(3,5-di-tert-butyl-4-hydroxyphenyl)propionate]methane, tris(3,5-di-tert-butyl-4-hydroxyphenyl)isocyanurate, tris[β-(3,5-di-tert-butyl-4-hydroxyphenyl)propionyloxyethyl]isocyanate, 4,4,-thiobis (3-methyl-6-tert-butylphenol), 2,2'-thiobis(4-methyl-6-tert-butylphenol), 4,4'-thiobis(2-methyl-6-tert-butylphenol), and N,N'-hexamethylenebis(3,5-di-tert-butylphenol-4-hydroxycynnamamide).

Examples of the amine-type antioxidant include 4,4'-bis (α, α-dimethylbenzyl)diphenylamine, phenyl-α-naphthylamine, phenyl-β-naphthylamine, N,N'-diphenyl-p-phenylenediamine, N,N'-di-,β-naphthyl-p-phenylenediamine, N-cyclohexyl-N'-phenyl-p-phenylenediamine, N-phenyl-N'-isopropyl-p-phenylenediamine, aldol-α-naphthylamine, a polymer of 2,2,4-trimethyl-1,2-dihydroquinone, and 6-ethoxy-2,2,4-trimethyl-1,2-dihydroquinoline.

Examples of the sulfur-type antioxidant includes thiobis (β-naphthol), thiobis (N-phenyl-β-naphthylamine), 2-mercaptobenzothiazole, 2-mercaptobenzoimidazole, dodecyl mercaptane, tetramethylthiuram monosulfide, tetramethylthiuram disulfide, nickel dibutyldithiocarbamate, nickel isopropylxanthate, dilaurylthiodipropionate and distearylthiodipropionate.

Examples of the copper compound include cuprous chloride, cuprous bromide, cuprous iodide, cupric chloride, cupric bromide, cupric iodide, cupric phosphate, cupric pyrophosphate, copper sulfide, copper nitrate and copper salts of organocarboxylic acid such as copper acetate and the like.

Examples of the halogenated alkali metal compound include lithium chloride, lithium bromide, lithium iodide, sodium fluoride, sodium chloride, sodium bromide, sodium iodide, potassium fluoride, potassium chloride, potassium bromide and potassium iodide. Among them, potassium iodide is particularly preferred.

These antioxidants can be used in a single kind or in combination. Among these antioxidants, it is particularly preferred to use the phosphorus-type antioxidant in a single kind or in combination with other antioxidant. It is further desired to use the copper compound in combination with the halogenated alkali metal compound.

Among these antioxidants, furthermore, it is desired to use the phosphorus-type antioxidant, phenol-type antioxidant, amine-type antioxidant and sulfur-type antioxidant in amounts of from 0.05 to 2 parts by weight, preferably, from 0.1 to 1.5 parts by weight and, most preferably, from 0.2 to 1.0 part by weight per 100 parts by weight of the polyamide (A).

It is further desired that the semiaromatic polyamide resin composition of the present invention is blended with various inorganic fillers of various forms, such as fibrous form, powdery form, granular form, plate, needles, cloth, mat or the like, as an inorganic reinforcing member.

Preferred examples of the fibrous inorganic filler include glass fiber, carbon fiber, asbestos fiber and boron fiber. Among them, the glass fiber is preferred. Use of the glass fiber improves the moldability and, further, improves mechanical properties such as tensile strength, bending strength and flexural modulus of elasticity of the molded article that contains the inorganic reinforcing member, and heat resisting property such as thermal deformation temperature. The glass fiber has an average length of, usually, from 0.1 to 20 mm and, preferably, from 0.3 to 6 mm, and an aspect ratio of, usually, from 10 to 2000 and, preferably, from 30 to 600. It is desired to use the glass fiber having an average length and an aspect ratio lying within the above-mentioned ranges. The glass fiber is blended in an amount of, usually, not larger than 200 parts by weight, preferably, from 5 to 180 parts by weight and, more preferably, from 5 to 150 parts by weight per 100 parts by weight of the resin component.

In addition to the above-mentioned fibrous inorganic filler, the present invention uses various other fillers in the form of a powder, granules, plate, needles, cloth or mat, such as powdery or plate-like inorganic compounds like silica, silica alumina, alumina, calcium carbonate, titanium dioxide, talc, wollastonite, diatomaceous earth, clay, kaolin, spherical glass, mica, gypsum, red iron oxide, magnesium oxide and zinc oxide, or needle-like inorganic compound such as potassium titanate.

These fillers may be used in two or more kinds in combination. It is further allowable to use these fillers after having treated them with a silane coupling agent or a titanium coupling agent.

The fillers have an average particle diameter of, usually, from 0.1 to 200 μm and, preferably, from 1 to 100 μm.

The fillers are used in an amount of usually, not larger than 200 parts by weight, preferably, not larger than 100 parts by weight and, particularly preferably, from 1 to 50 parts by weight per 100 parts by weight of the resin component.

In addition to the above-mentioned components, furthermore, the polyamide resin composition of the present invention may be blended with additives such as organic filler, heat stabilizer, aging stabilizer, antistatic agent, anti-slipping agent, anti-blocking agent, defogging agent, lubricant, pigment, dye, natural oil, synthetic oil and wax.

Examples of the organic filler include wholly aromatic polyamides such as polyparaphenylene terephthalamide, polymetaphenylene terephthalamide, polyparaphenylene isophthalamide, polymetaphenylene isophthalamide, a condensation product of diaminodiphenyl ether and terephthalic acid (isophthalic acid), and a condensation product of para (meta)aminobenzoic acid; wholly aromatic polyamideimide such as a condensation product of diaminodiphenyl ether and trimellitic anhydride or pyromellitic anhydride; wholly aromatic polyester; wholly aromatic polyimide; heterocyclic ring-containing compounds such as polybenzimidazole and polyimidazophenanthroline; and secondarily worked powdery, plate-like, fibrous or cloth-like articles formed of polytetrafluoroethylene.

By using the thus prepared semiaromatic polyamide resin composition, it is allowed to prepare a molded article of a desired shape based on an ordinary melt-molding method, such as compression molding method, injection-molding method or extrusion-molding method.

For example, the semiaromatic polyamide resin composition of the present invention is thrown into an injection-molding machine of which the cylinder temperature is adjusted to be from about 350 to about 300° C., and is melted and is, then, introduced into a metal mold of a predetermined shape to prepare a molded article.

The semiaromatic polyamide resin composition of the present invention exhibits particularly excellent metal mold ejectability during the molding operation, and is very useful for producing products by using a complex metal mold, such as connectors for connecting the electronic circuits together, and makes it possible to efficiently produce such products. Besides, the connector made of the semiaromatic polyamide resin composition of the present invention has excellent heat resistance as well as an advantage in that the connector is deformed little by stress under high temperature and high humidity conditions.

There is no particular limitation on the shape of the molded article produced by using the semiaromatic resin composition of the present invention, and there can be produced, for example, electrically-driven tools as well as general industrial parts, machine parts such as gears and cams, as well as molded articles of various forms such as electronic parts like housing for the printed wiring boards and electronic parts. The semiaromatic resin composition of the invention is particularly suited for forming parts mounted on the inside and outside of automobiles, for forming parts in the engine room and for forming electric equipment for automobiles.

EXAMPLES

The invention will now be described in further detail by way of Examples. Without departing from the gist, however, the invention is in no way limited to these Examples only. In the Examples, the melting point and the degree of crystallization were measured and the properties of the obtained resin compositions were evaluated according to the methods described below.

Density

A strand obtained at the time of measuring a melt flow rate (MFR) under conditions of 190° C., 2.16 kg load, was heat-treated at 120° C. for an hour and then was slowly cooled to room temperature for an hour. The density of the heat-treated and cooled strand was measured by a density-gradient tube.

Melting Point

An endothermic curve was found by using a DSC and a temperature at a maximum peak position was regarded to be a melting point (Tm).

The endothermic curve was found by packaging the sample in an aluminum pan, quickly heating the sample up to 340° C., maintaining the sample at 340° C. for 5 minutes, lowering the temperature down to room temperature at a rate of 20° C./min., and, then, raising the temperature at a rate of 10° C./min.

Glass Transition Point (Tg)

Found in compliance with ASTM D 3418.

Degree of Crystallization

A pressed sheet having a thickness of 1 mm was prepared, and the degree of crystallization was measured based on the X-ray diffraction method at 23° C.

Mechanical Strength

1̂ Flexural modulus of elasticity (FM).

Measured in compliance with the method of ASTM D-790.

2̂ Izod impact strength (IZ).

Measured in compliance with the method of ASTM D-256 (with notch).

Flexural Anti-creeping Property

Measured in compliance with the method of JIS K7116. However, the testing atmosphere complied with the conditions of a temperature of 40° C. and a relative humidity of 93% specified under JIS C 0022, and the property was evaluated in terms of the amount of distortion after 7 days have passed.

Evaluating the Clogging of Metal Mold (1) An air vent having a depth of 10 μm and a width of 3 mm was formed at an end of a metal mold for preparing a test piece as shown in FIG. 1(A), and the resin composition was injection-molded under the molding conditions described below.

(2) Molding conditions.
    a. Molding machine: SG50-MIII manufactured by Sumitomo Heavy Machinery Industries Co.
    b. Molding conditions.
        Cylinder setpoint temperature: 320° C.
        Metal mold temperature: 120° C.
        Injection speed: 60 mm/sec.

(3) Judging the clogging of vent.

When the polyamide containing much unreacted monomer, low grade oligomer and decomposed product of polymer, is repetitively molded, these components deposit on the vent to clog the vent.

When the vent is clogged, the air in the metal mold is ventilated little, whereby the gas is adiabatically compressed at the final filled portion and the temperature elevates.

Figure 1B:
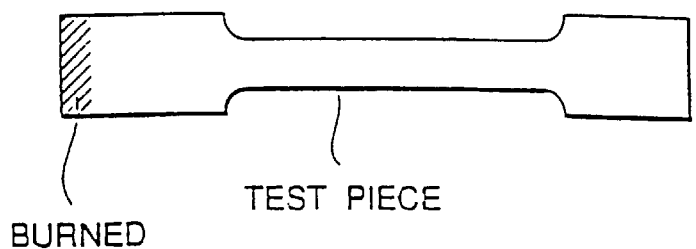
FIG. 1(B) is a view illustrating the "gas-burning" of a molded product.

As the temperature of the gas is elevated, the resin contacting thereto is carbonized and blackened ("gas burning"), and the end of the obtained test piece is blacked as shown in FIG. 1(B). At a moment when the test piece is blacked, it is judged that the vent is clogged.

Heat Distorsion Temperature (HDT)

Measured in compliance with the method of ASTM D 648.

Ejecting Force

A metal mold having many pins and a wide surface area like a connector is used. After the molding, the metal mold is opened, and the molded article is pushed out from the metal mold (of the moving side) by using a pushing mechanism. The pressure required for the pushing is measured by a sensor.

Reference Example 1

Preparation of a Semiaromatic Polyamide 139.3 Grams (1.20 mols) of a 1,6-diaminohexane, 139.3 g (1.20 mols) of a 2-methyl-1,5-diaminopentane, 365.5 g (2.2 mols) of terephthalic acid, 0.55 g ($5.2 \times 10^{-3}$ mols) of sodium hypophosphite as a catalyst, and 64 ml of ion-exchanged water, were fed into a 1-liter reactor and, after substituted with nitrogen, were reacted under the conditions of 250° C, 35 kg/cm$^2$ for one hour. The molar ratio of the 2-methyl-1,5-diaminopentane to the 1,6-diaminohexane was 50:50.

After one hour has passed, the reaction product formed in the reactor was transferred into a receiving container coupled to the reactor and in which the pressure was set to be lower by about 10 kg/cm$^2$ to obtain 561 g of a polyamide precursor having an intrinsic viscosity [η] of 0.15 dl/g.

Then, the polyamide precursor was dried, and was melt-polymerized by using a biaxial extruder at a cylinder setpoint temperature of 330° C. to obtain a semiaromatic polyamide (PA-1). The aromatic polyamide possessed the following composition.

The diamine component unit contained 50 mol % of the 1,6-diaminohexane component unit and 50 mol % of the 2-methyl-1,5-diaminopentane component unit.

Reference Example 2

Preparation of a Semiaromatic Polyamide 269.3 Grams (2.32 mols) of a 1,6-diaminohexane, 205.6 g (1.24 mols) of terephthalic acid, 148.0 g (1.01 mols) of adipic acid, 0.48 g ($4.50 \times 10^{-3}$ mols) of sodium hypophosphite as a catalyst, 3.43 g ($2.81 \times 10^{-2}$ mols) of benzoic acid as a molecular weight-adjusting agent and 62 ml of ion-exchanged water, were fed into a 1-liter reactor and, after substituted with nitrogen, were reacted under the conditions of 250° C., 35 kg/cm² for one hour. The molar ratio of the terephthalic acid to the adipic acid was 55:45.

After one hour has passed, the reaction product formed in the reactor was transferred into a receiving container coupled to the reactor and in which the pressure was set to be lower by about 10 kg/cm² to obtain 559 g of a polyamide precursor having an intrinsic viscosity [η] of 0.15 dl/g.

Then, the polyamide precursor was dried, and was melt-polymerized by using a biaxial extruder at a cylinder set-point temperature of 330° C. to obtain a semiaromatic polyamide (PA-2). The aromatic polyamide possessed the following composition.

The dicarboxylic acid component unit contained 55 mol % of the terephthalic acid component unit and 45 mol % of the adipic acid component unit.

Reference Example 3

Preparation of a Modified Ethylene/1-Butene Copolymer

100 Parts by weight of an ethylene/1-butene copolymer prepared by using a Ti catalyst [(PE-1), density =0.92 g/cm³, melting point (Tm) =124° C., degree of crystallization=48%, MFR (ASTM D 1238, 190° C., load of 2.16 kg)=1.0 g/10 min, ethylene content=96 mol %], 0.8 parts by weight of maleic anhydride, and 0.07 parts by weight of a peroxide [trade name: Perhexyne-25B, produced by Nihon Yushi Co.], were mixed together in a Henschel's mixer, and the obtained mixture was melt graft-modified using a monoaxial extruder maintained at 230° C. and having a diameter of 65 mm, thereby to obtain a modified ethylene/1-butene copolymer [abbreviated as (MAH-PE-1)].

The grafted amount of the maleic anhydride in the modified ethylene/1-butene copolymer (MAH-PE-1) was measured by the IR analysis to be 0.8% by weight. The MFR (ASTM D 1238, 190° C., load of 2.16 kg) was 0.27 g/10 min., and the melting point was 122° C. The density was 0.92 g/cm³.

Reference Example 4

Preparation of a Modified Ethylene/Propylene Copolymer

A modified ethylene/propylene copolymer [abbreviated as (MAH-PE-2)] graft-modified with the maleic anhydride was obtained in quite the same manner as in Reference Example 3 but using an ethylene/propylene copolymer having a density of 0.87 g/cm³ and an MFR (ASTM D 1238, 190° C., load of 2.16 kg) of 1 g/10 min.

The grafted amount of the maleic anhydride in the modified ethylene/propylene copolymer (MAH-PE-2) was measured by the IR analysis to be 1.0% by weight. The MFR (ASTM D 1238, 190° C., load of 2.16 kg) was 0.3 g/10 min., and the melting point was 118° C. The density was from 0.87 to 0.88 g/cm³.

Examples 1 to 3

The semiaromatic polyamides PA-1, PA-2 obtained in Reference Examples 1 and 2, the modified ethylene/1-butene copolymer (MAH-PE-1) obtained in Reference Example 3, nylon 12 [abbreviated as (PA-3)] and talc were mixed together at ratios shown in Table 1, and were melt-mixed together by using a vent-type biaxial screw extruder having a diameter of 30 mm at a cylinder temperature of from 300 to 335° C. to prepare pellets of semiaromatic polyamide resin compositions.

When reference was made to the dicarboxylic acid component in the constituent components comprising the polyamides (PA-1) and (PA-2), the content of the terephthalic acid component unit was 72 mol % and the content of the adipic acid component unit was 28 mol %. When reference was made to the diamine component, the content of the 1,6-diaminohexane component unit was 81 mol % and the content of the 2-methyl-1,5-diaminopentane component unit was 19 mol %. The melting point of the blend of the polyamides (PA-1) and (PA-2) was 305° C. from the result of DSC of the whole composition. Tg was 105° C.

The nylon 12 that was used was UBENY 12, 3014B (flexural modulus of elasticity of 1450 MPa) manufactured by Ube Kosan Co.

By using the thus obtained pellets, the injection-molded test pieces were prepared and were evaluated for their properties.

The evaluated results were as shown in Table 1.

Figure 2:
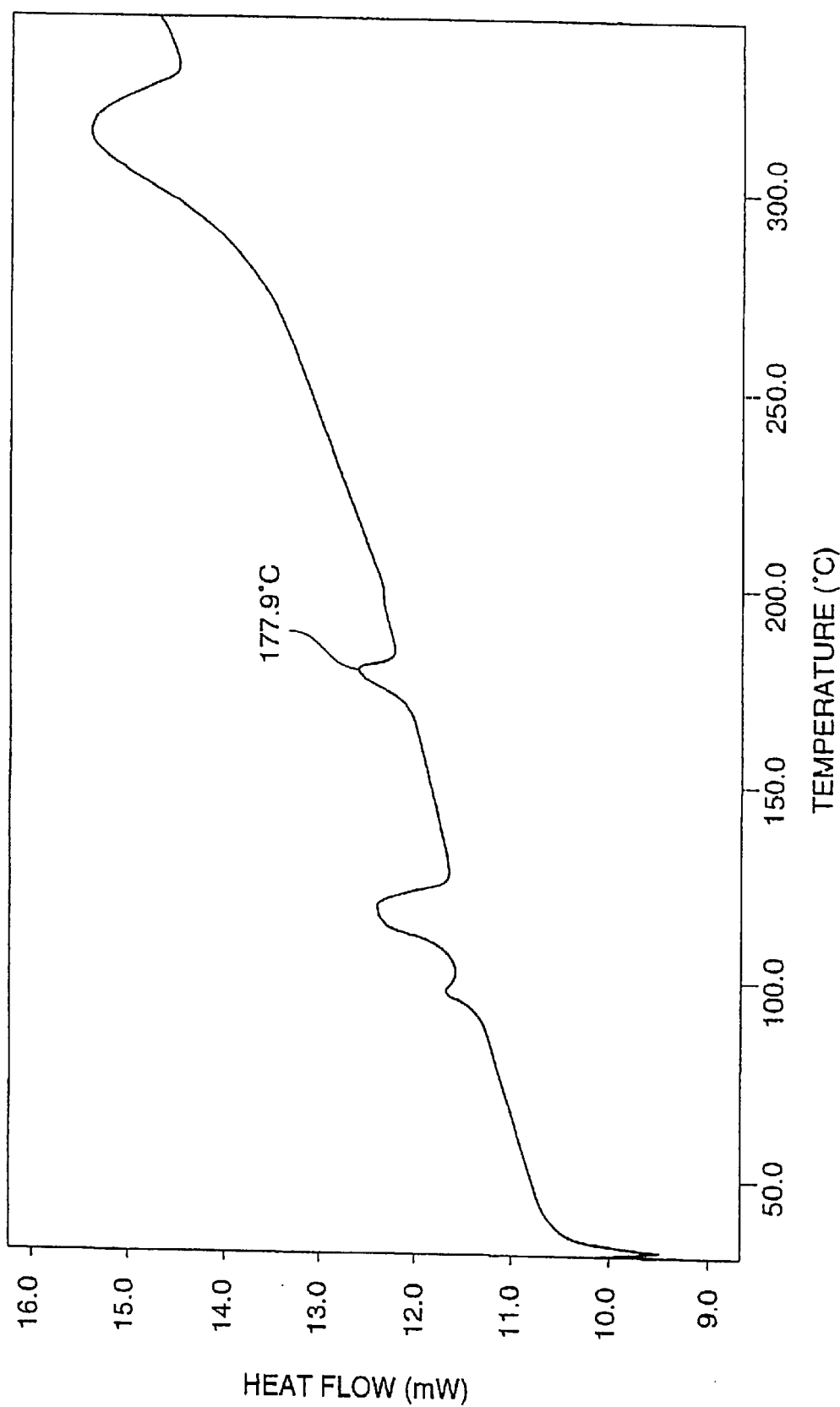
FIG. 2 is a drawing illustrating an endothermic curve of a semiaromatic polyamide resin obtained in Example 3 as measured by using a DSC.

FIG. 2 shows an endothermic curve of the semiaromatic polyamide resin composition prepared in Example 2 as measured by using the DSC.

Example 4

An injection-molded test piece was prepared by using a semiaromatic polyamide resin composition in quite the same manner as in Example 2 but using the modified ethylene/propylene copolymer (MAH-PE-2) prepared in Reference Example 4 instead of using MAH-PE-1, and its properties were evaluated.

The results were as shown in Table 1.

Comparative Example 1

An injection-molded test piece was prepared by using a semiaromatic polyamide resin composition of a blend shown in Table 1 in the same manner as in Examples 1 to 3 but without using nylon 12, and its properties were evaluated.

The results were as shown in Table 1.

Comparative Examples 2 and 3

The procedure was conducted in the same manner as in Example 2 but using nylon 6,6 (abbreviated as PA-66) or nylon 11 (abbreviated as PA-11) instead of using the nylon 12 (PA-3). The results were as shown in Table 1.

Amilan CM3007 produced by Toray Co. was used as the nylon 6,6, and Rilusan BMN-0 produced by Toray Co. was used as the nylon 11.

Comparative Example 4

Instead of blending the semiaromatic polyamides (PA-1, PA-2) and the nylon 12 (PA-12), use was made of a copolymer composition (hereinafter abbreviated as COPA) containing polyamide units thereof. The copolymer composition (COPA) was prepared in a manner as described below.

The polyamide precursor having an intrinsic viscosity [η] of 0.15 dl/g prepared in Reference Example 2 for the production of the aromatic polyamide (PA-2) and an aminododecanoic acid monomer were blended together at a weight ratio of 93:7, and were melt-polymerized by using a biaxial extruder at a cylinder setpoint temperature of 330° C. to obtain a copolymerized polyamide which possessed the following composition.

The dicarboxylic acid component unit contained 55 mol % of the terephthalic acid component unit and 45 mol % of the adipic acid component unit, and the copolymerized polyamide contained 7% by weight of the aminododecanoic acid component unit.

Then, the polyamide (PA-1) prepared in Reference Example 1 and the copolymerized polyamide obtained above were blended together at a weight ratio of 36.1:63.9, and were melt-extruded by using a biaxial extruder at a cylinder setpoint temperature of 330° C. to obtain a copolymerized polyamide composition (COPA) which possessed the following composition.

The diamine component unit contained 82 mol % of the 1,6-diaminohexane component unit and 18 mol % of the 2-methyl-1,5-diaminopentane component unit.

The dicarboxylic acid component unit contained 71 mol % of the terephthalic acid component unit, 29 mol % of the adipic acid component unit and 4.5% by weight of the aminododecanoic acid component unit.

Figure 3:
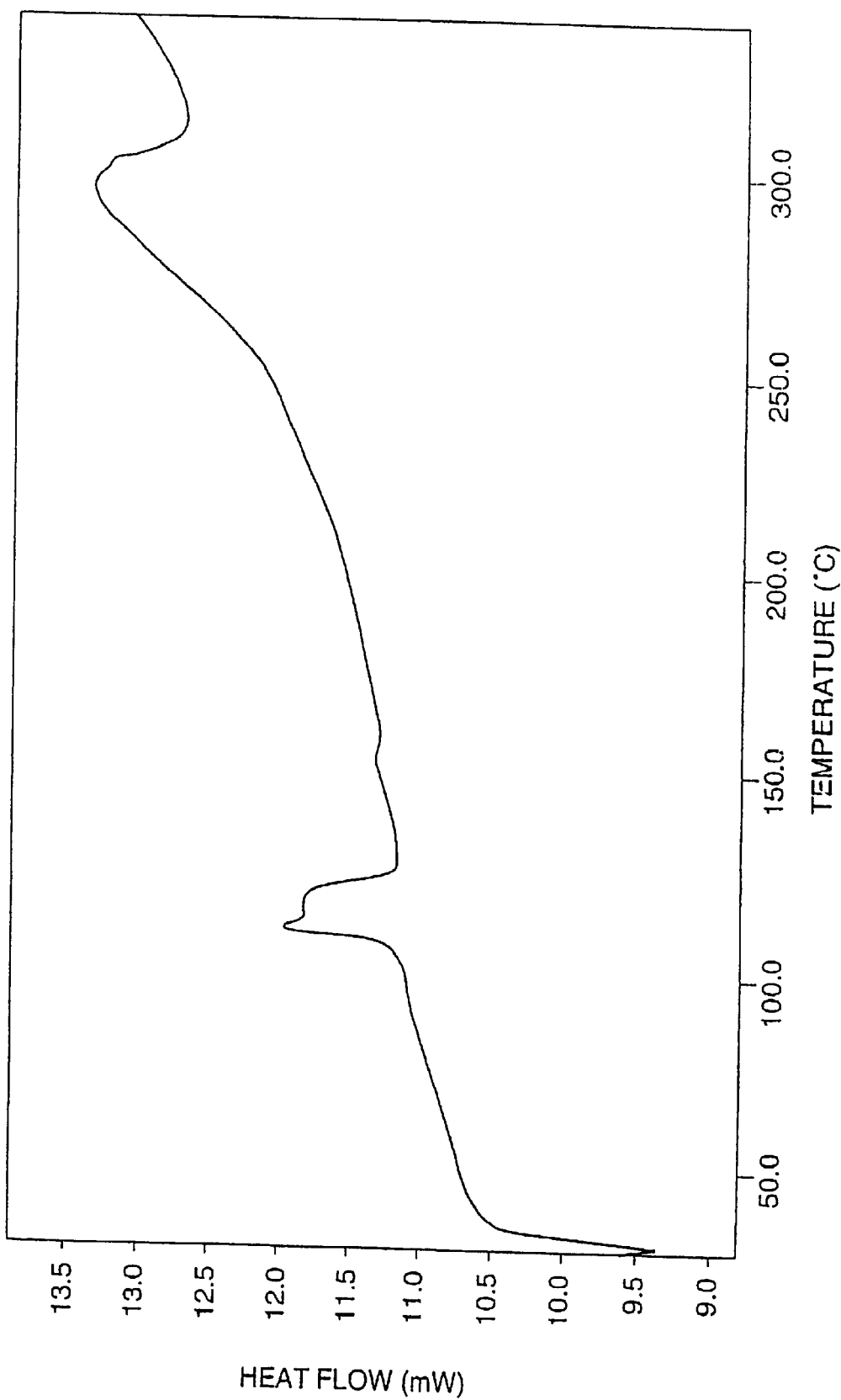
FIG. 3 is a drawing illustrating an endothermic curve of a semiacromatic polyamide resin obtained in Comparative Example 4 as measured by using the DSC.

The above-mentioned copolymerized polyamide composition (COPA) was blended with the modified ethylene/1-butene copolymer (MAH-PE-1) obtained in Reference Example 3 and talc at a ratio shown in Table 1, to prepare pellets of a semiaromatic polyamide resin composition in quite the same manner as in Examples 1 to 3, thereby to prepare an injection-molded test piece comprising this resin composition and to evaluate its properties. The results were as shown in Table 1. FIG. 3 shows an endothermic curve of the semiaromatic polyamide resin composition obtained above as measured by using the DSC.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| PA-1 (parts by wt.) | 30 | 30 | 30 | 30 | 30 | 30 | 30 | COPA |
| PA-2 (parts by wt.) | 50 | 50 | 50 | 50 | 50 | 50 | 50 | 85 |
| PA-3 (parts by wt.) | 1 | 3 | 5 | 5 | — | — | — | — |
| PA-66 (parts by wt.) | — | — | — | — | — | 5 | — | — |
| PA-11 (parts by wt.) | — | — | — | — | — | — | 5 | — |
| MAH-PE-1 (parts by wt.) | 19 | 17 | 15 | — | 20 | 15 | 15 | 15 |
| MAH-PA-2 (parts by wt.) | — | — | — | 15 | — | — | — | — |
| Talc (parts by wt.) | 1 | 1 | 1 | 1 | 1 | 1 | 1 | 1 |
| Melting Point at 165–230° C. | yes | yes | yes | yes | — | — | — | no |
| FM (MPa) | 2200 | 2300 | 2400 | 2100 | 2160 | 2450 | 2400 | 2350 |
| IZ (J/m) | 200 | 150 | 100 | 250 | 220 | 90 | 100 | 150 |
| HDT (° C.) | 98 | 100 | 105 | 95 | 97 | 107 | 105 | 103 |
| Ejecting force (kg) | 46 | 42 | 39 | 40 | 48 | 49 | 50 | 49 |
| *Vent clogging | ○ | ○ | ○ | ○⁻ | ○ | ○ | ○ | ○ |
| *Creep deformation | ○⁻ | ○ | ○ | Δ | Δ | ○ | ○ | ○ |

Vent clogging: Evaluated as the number of times of shooting until clogged.
○: >8000 times
○⁻: 6000–8000 times
Δ: 4000–6000 times
X: <4000 times
Creep deformation: Evaluated as the deformed amount (mm).
○: ≦0.8 mm
○⁻: 0.8–1.2 mm
Δ: 1.2–1.6 mm
X: >1.6 mm The semiaromatic polyamide resin composition of the present invention exhibits particularly excellent ejectability (easiness for molded parts to be ejected from the mold) during the molding operation, and can be particularly effectively used for the production of connector parts that are molded by using metal molds having complex structures.

Further, the resin composition of the present invention little precipitates the oligomer during the molding, little causes the vent of the metal mold to be clogged, is suited for conducting the molding operation for extended periods of time, and further exhibits excellent resistance against aging by heat, anti-creeping property and shock resistance.

What is claimed is:

1. A semiaromatic polyamide resin composition consisting essentially of
   (A) a copolyamide formed of a recurring unit of a dicarboxylic acid component unit and a diamine component unit, at least 45 mol % of said dicarboxylic acid component unit being a terephthalic acid component unit, and said diamine component unit consisting essentially of 55 to 99 mol % of a straight-chain alkylenediamine component unit having 4 to 18 carbon atoms and 1 to 45 mol % of an alkylenediamine component unit having a side-chain alkyl group and 4 to 18 carbon atoms;
   (B) an aliphatic polyamide containing not smaller than 50 mol % of the total amount of at least one unit selected from the group consisting of (i) a unit derived from a lactam having 12 carbon atoms, (ii) a unit derived from an aminocarboxylic acid having 12 carbon atoms and (iii) a unit derived from a dodecanoic diacid and a diamine; and (C) at least one graft-modified product selected from the group consisting of a graft-modified product of an ethylene/α-olefin copolymer, wherein said α-olefin has 3 to 20 carbon atoms, a graft-modified product of an aromatic vinyl compound/conjugated diene copolymer, and a graft-modified product of a hydrogenated product of the aromatic vinyl compound/conjugated diene copolymer;

said component (A) being contained in an amount of from 98 to 65% by weight, said component (B) being contained in an amount of from 1 to 10% by weight, and said component (C) being contained in an amount of from 1 to 25% by weight per the sum of the components (A), (B), and (C).

2. The semiaromatic polyamide resin composition according to claim 1, wherein said copolyamide (A) contains an aromatic carboxylic acid unit other than the terephthalic acid and/or an aliphatic dicarboxylic acid unit having 4 to 20 carbon atoms in an amount of not larger than 55 mol % per the whole dicarboxylic acid units.

3. The semiaromatic polyamide resin composition according to claim 1, wherein the maximum endothermic peak temperature in the endothermic curve of the composition found by using a Differential Scanning Calorimeter (DSC), is from 165 to 230° C.

4. The semiaromatic polyamide resin composition according to claim 1, wherein said copolyamide (A) has a melting point of from 280 to 330° C.

5. The semiaromatic polyamide resin composition according to claim 1, wherein said polyamide (B) has a flexural modulus of elasticity of not smaller than 1300 MPa as measured in the form of an injection-molded test piece in compliance with ASTM D 790.

6. The semiaromatic polyamide resin composition according to claim 1, wherein said graft-modified product (C) has a density over a range of from 0.85 to 0.95 g/cm$^3$.

7. The semiaromatic polyamide resin composition according to claim 1, wherein the polyamide resin composition contains an inorganic filler in an amount of from 1 to 200 parts by weight per 100 parts by weight of the resin component.

8. A connector formed of a semiaromatic polyamide resin composition of claim 1.

9. A semiaromatic polyamide resin composition consisting essentially of (A) a copolyamide formed of a recurring unit of a dicarboxylic acid component unit and a diamine component unit, at least 45 mol % of said dicarboxylic acid component unit being a terephthalic acid component unit, and said diamine component unit consisting essentially of 55 to 99 mol % of a straight-chain alkylenediamine component unit having 4 to 18 carbon atoms and 1 to 45 mol % and an alkylenediamine component unit having a side-chain alkyl group and 4 to 18 carbon atoms, wherein said copolyamide (A) contains an aromatic carboxylic acid unit other than the terephthalic acid and/or an aliphatic dicarboxylic acid unit having 4 to 20 carbon atoms in an amount of not larger than 55 mol % per the whole dicarboxylic acid units;

(B) an aliphatic polyamide containing not smaller than 50 mol % of the total amount of at least one unit selected from the group consisting of (i) a unit derived from a lactam having 12 carbon atoms, (ii) a unit derived from an aminocarboxylic acid having 12 carbon atoms and (iii) a unit derived from a dodecanoic diacid and a diamine; and (C) at least one graft-modified product selected from the group consisting of a graft-modified product of an ethylene/α-olefin copolymer, wherein said α-olefin has 3 to 20 carbon atoms, a graft-modified product of an aromatic vinyl compound/conjugated diene copolymer, and a graft-modified product of a hydrogenated product of the aromatic vinyl compound/conjugated diene copolymer;

said component (A) being contained in an amount of from 98 to 65% by weight, said component (B) being contained in an amount of from 1 to 10% by weight, and said component (C) being contained in an amount of from 1 to 25% by weight per the sum of the components (A), (B) and (C).

10. A semiaromatic polyamide resin composition comprising (A) a copolyamide consisting essentially of (1) recurring units of a dicarboxylic acid component unit and (2) recurring units of a diamine component unit, (1) wherein at least 45 mol % of said dicarboxylic acid component unit being a terephthalic acid component unit and contains an aromatic carboxylic acid unit other than the terephthalic acid and/or an aliphatic dicarboxylic acid unit having 4 to 20 carbon atoms in an amount of not larger than 55 mol % per the whole dicarboxylic acid units, and (2) wherein said diamine component unit consists essentially of 55 to 99 mol % of a straight-chain alkylenediamine component unit having 4 to 18 carbon atoms and 1 to 45 mol % of an alkylenediamine component unit having a side-chain alkyl group and 4 to 18 carbon atoms;

(B) an aliphatic polyamide containing not smaller than 50 mol % of the total amount of at least one unit selected from the group consisting of (i) a unit derived from a lactam having 12 carbon atoms, (ii) a unit derived from an aminocarboxylic acid having 12 carbon atoms and (iii) a unit derived from a dodecanoic diacid and a dianine; and (C) at least one graft-modified product selected from the group consisting of a graft-modified product of an ethylene/a-olefin copolymer, wherein said α-olefin has 3 to 20 carbon atoms, a graft-modified product of an aromatic vinyl compound/conjugated diene copolymer, and a graft-modified product of a hydrogenated product of the aromatic vinyl compound/conjugated diene copolymer;

said component (A) being contained in an amount of from 98 to 65% by weight, said component (B) being contained in an amount of from 1 to 10% by weight, and said component (C) being contained in an amount of from 1 to 25% by weight per the sum of the components (A), (B) and (C).

* * * * *